United States Patent [19]

Teruo

[11] Patent Number: 5,311,779

[45] Date of Patent: May 17, 1994

[54] PRESSURE-SENSITIVE SENSOR

[75] Inventor: Okamoto Teruo, Osaka, Japan

[73] Assignee: Inabagomu Co., Ltd., Osaka, Japan

[21] Appl. No.: 817,041

[22] Filed: Jan. 3, 1992

[51] Int. Cl.⁵ .............................................. G01M 9/04
[52] U.S. Cl. ........................................ 73/726; 73/720;
73/753; 73/862.629; 338/4
[58] Field of Search .................. 73/706, 718, 724, 726,
73/727, 725, 754, 720, 721, 862.627, 862.629,
862.632, 862.628, 862.625, 753; 338/36, 47, 4, 6

[56] References Cited

U.S. PATENT DOCUMENTS

5,045,829 9/1991 Kuramochi et al. ................... 73/725

Primary Examiner—Donald O. Woodiel
Attorney, Agent, or Firm—Armstrong, Westerman, Hattori, McLeland & Naughton

[57] ABSTRACT

A pressure sensitive sensor in which a pressure detecting convex portion is formed on the surface of a pressure-sensitive and conductive elastomer sheet, and an electrode is arranged on the reverse side of the pressure detecting convex portion for making it possible to detect a pressure acting in the direction in parallel or in the oblique direction with a slight angle with respect to the surface of a pressure-sensitive and conductive elastomer component. In addition, for obtaining a high detection density, a contact is made up with a face-defined body defining a pressure face, and a contacting convex portion is made to protrude from the face-defined body, where the contact is resiliently supported onto the pressure-sensitive elastomer sheet.

8 Claims, 7 Drawing Sheets

PRESSURE-SENSITIVE SENSOR

BACKGROUND OF THE INVENTION

1. Field of the Invention

The present invention relates to an improved technique for the construction of sensors by making use of the properties of a pressure-sensitive and conductive elastomer, and more particularly to a technique of largely improving the construction of a pressure-sensitive portion to sense a pressure and thereby having the construction possess the function as a tactile means which has not so far existed, being further concerned with sensors having particular utility in devices and equipment provided with a tactile means such as pressure-sensitive sensors, for example, industrial robots operated in the fields of food handling, medical treatment, and the like.

2. Description of the Related Art

Among materials which, when not under pressure, display a high value of electrical resistance and come to possess insulation properties, and when put under pressure, display a low value of electrical resistance by being compressed and deformed and come to possess conductive properties, there are known in the prior art pressure-sensitive and conductive elastomers typically represented by pressure-sensitive and conductive rubber, which are disclosed in, for example, Japanese Examined Patent Application Nos. SHO-(56)-9187, SHO-(56)-54019, SHO-(60)-722, SHO-(60)-723 and the like.

This type of pressure-sensitive and conductive elastomer is composed by mixing and dispersing conductive particles, such as metals and granulated carbon, with insulating substances made of rubber or elastomer, having the material that it becomes an insulating properties when it is not under pressure because conductive particles are spaced from each other, and, when placed under pressure, it displays a decreasing value of electrical resistance and becomes a conductive substance because conductive particles are made to approach or contact each other.

Figure 21:
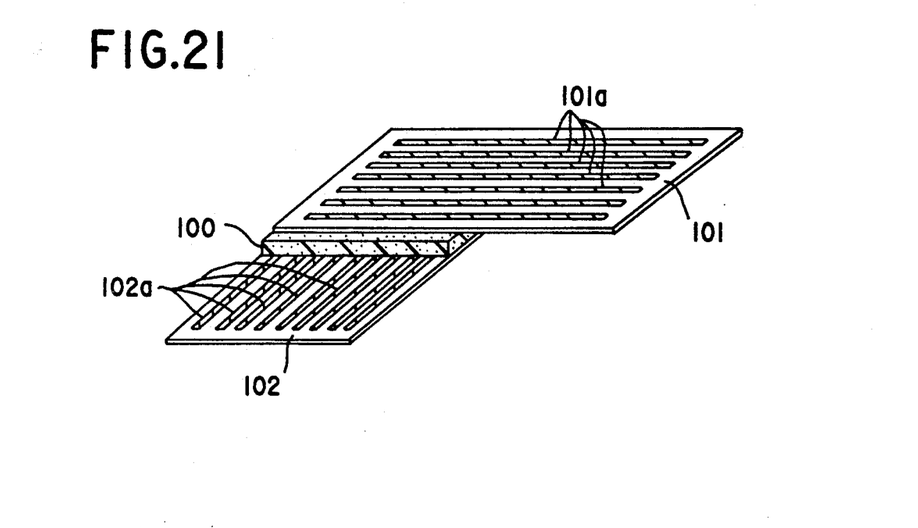
FIG. 21 is a perspective view illustrating an example in the prior art.

There are known in the prior art the application of such properties of pressure-sensitive and conductive elastomer, in which, as illustrated in FIG. 21, flexible print substrates 101, 102 which are in the film state are arranged on the upper and lower surfaces of a pressure-sensitive and conductive elastomer 100, respectively. And groups of electrodes 101a . . . 101a and other groups of electrodes 102a . . . 102a are arranged in many lines and at the predetermined intervals on the print substrates 101, 102, respectively, are made to cross at right angles with respect to each other. In this sensor, when the pressure-sensitive and conductive elastomer 100 is compressed and deformed by a pressure given on a particular spot, a continuity condition is established between the electrodes 101a of the print substrate at the upper side and the electrodes 102a of the print substrate 102 at the lower side, the locations of which correspond to the above-mentioned particular spot. It is then possible to assign the X-Y coordinates at a spot to which a pressure is given from positions in the X direction of the electrodes 101a and in the Y direction of the electrodes 102a, which are both in the continuity condition. Furthermore, the quantity of the pressure is known by the quantity energized at the establishment of the continuity condition.

There have been, however, disadvantages in the afore-mentioned conventional sensor.

Because the flexible print substrate 101 arranged on the upper side of the pressure-sensitive and conductive elastomer sheet 100 is composed by sticking the electrodes made of copper or aluminum foil onto the film made of plastic materials such as polyester or polyamide, the pressure force which is given from above does not act directly on the pressure-sensitive and conductive elastomer sheet 100 but acts thereon indirectly or through the flexible print substrate 101. The pressure force is then dispersed by the flexible print substrate 101, and, consequently, the resolving power is decreased to the degree less than that to be exerted by the properties of the pressure-sensitive and conductive elastomer sheet 100.

Furthermore, the above-mentioned sensor can detect the only and one direction in which a pressure acts, which is the direction perpendicular to the upper surface of the pressure-sensitive and conductive elastomer sheet 100. A pressure oriented in the direction parallel with said upper surface is not detected. Objects detectable are limited to a position of X-Y coordinates which is under pressure and the quantity of the pressure. If a pressure is obliquely given, it is impossible to discriminate the left, right, forward or backward direction wherein a pressure is given. The above-mentioned conventional sensor is, therefore, not useful as a direction sensing means.

The present invention is made in view of the above-mentioned disadvantages and directly addressing the problems of a decrease in resolving power and the inability of detecting the direction of pressure. The present invention provides with high resolving power and the capabilities of detecting a number of directions wherein pressures are given, of discriminating the oblique, left, right, forward, and backward directions, and of efficiently functioning as a tactile means.

SUMMARY OF THE INVENTION

A pressure-sensitive sensor in accordance with the present invention is characterized by having the following construction for achieving the afore-mentioned technical task:

The pressure-sensitive sensor of the present invention a pressure-sensitive conductive elastomer component and an electrode which is arranged on the reverse side of said pressure-sensitive and conductive elastomer component and which senses changes in the electrical resistance occurring in response to the deformation, which comprises: the formation of a pressure detecting convex portion on the surface side of the above-mentioned pressure-sensitive and conductive elastomer component, and the arrangement of an electrode on the reverse side of a position where said pressure detecting convex portion is defined. In this case, preferably, on the surface of the pressure-sensitive and conductive elastomer component are formed a plurality of pressure detecting convex portions maintaining the predetermined regularity, and on the reverse side of each position where each pressure detecting convex portion is formed is arranged an electrode.

The more effective construction comprises a contact having not only a face-defined body defining a pressure face but also a contacting convex portion which is made to protrude from said face-defined body, a pressure-sensitive and conductive elastomer component which is to be under a pressure fed from the pressure face of said contact, an electrode being connected to the above-mentioned pressure face through said pressure-sensitive and conductive elastomer component and taking out changes in the electrical resistance occurring in response to the deformation of said pressure-sensitive and conductive elastomer component, the afore-mentioned contact shiftably supported with respect to the afore-mentioned pressure-sensitive and conductive elastomer component, and the afore-mentioned contacting convex portion of the contact made to protrude outwardly of the pressure-sensitive and conductive elastomer component.

Means employed in case of need are the provision of an insulation shell to cover the surface of pressure-sensitive and conductive elastomer component, the positioning of a face-defined body of a contact inwardly of the above-mentioned insulation shell, and making a contacting convex portion of said contact protrude outwardly of the surface of the above-mentioned insulation shell.

A contact to be employed is such made of plastic, ceramic, rubber or metallic materials and having an overload preventing convex portion defined on the pressure face of said contact, and an insulation shell to be employed is such made of synthetic rubber or thermoplastic elastomer.

Furthermore, electrodes to be employed are such being disposed on a plurality of spots around a position corresponding to the center of a pressure face of the contact, and an operation circuit for dealing with the electric signals supplied from the electrodes is internally incorporated.

DESCRIPTION OF THE PREFERRED EMBODIMENTS

Figure 1:
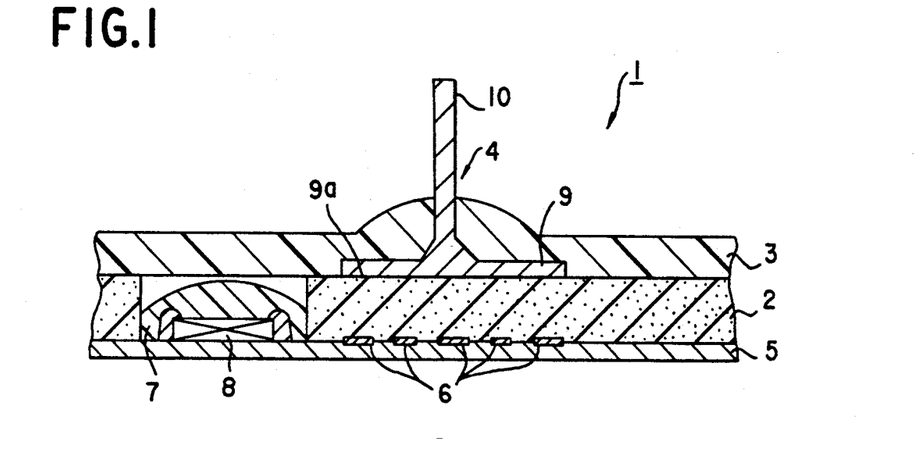
FIG. 1 is an enlarged vertical sectional front view illustrating the major portion of a pressure-sensitive sensor related to the 1st embodiment of the present invention.

Referring to the drawings, description of a first embodiment of a pressure-sensitive sensor in accordance with the present invention will be now made:

Referring to FIG. 1, a pressure-sensor 1 has a pressure-sensitive and conductive elastomer sheet 2, an insulation shell 3 stuck onto the upper surface of the pressure-sensitive and conductive elastomer sheet 2, a contact 4 having high rigidity and resiliency and shiftably supported by the insulation shell 3, a printing circuit substrate 5 disposed under the pressure-sensitive and conductive elastomer sheet 2, electrodes 6 (electrode patterns) provided on the upper surface of the printing circuit substrate 5 and being in contact with the lower side of the pressure-sensitive and conductive elastomer sheet 2, and a control means provided in the side direction of the electrodes 6 on the upper surface of the printing circuit substrate 5 and made up with IC, LSI, etc. which are covered by protecting film 7.

The pressure-sensitive and conductive elastomer sheet 2 to be employed may be a conventional one, but it is preferable to use such composed by mixing and dispersing granulated or spherical carbon particles with and in silicone rubber.

The contact 4, which should have high rigidity and durability requirements, may be constructed of metals, ceramic, plastic or rubber. However, it is preferable to employ molded plastic or rubber.

Although there is no requirement for materials in the insulation shell 3, synthetic rubber or thermoplastic elastomer such as polychloroprene rubber, acrylonitrile rubber, ethylen propylen rubber, silicone rubber, fluororubber, etc. may be employed. It is particularly preferable to employ molded rubber having high resiliency.

In this embodiment, essentially, the insulation shell 3 is securely attached to the contact 4, and the thickness should be about 0.5 mm for the insulation shell 3, about 0.3 to 0.5 mm for the pressure-sensitive and conductive elastomer sheet 2, and about 0.1 to 0.5 mm for the printing circuit substrate 5.

Figure 2:
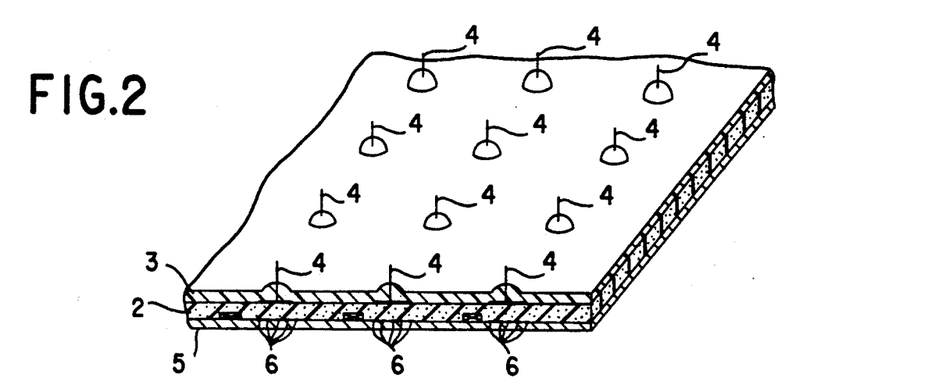
FIG. 2 is a perspective view illustrating the whole construction of the pressure-sensitive sensor related to the 1st embodiment of the present invention.

The contacts 4 and the electrodes 6 corresponding thereto are as shown in FIG. 2 arranged at a plurality of spots maintaining a predetermined regularity, which are illustrated to have equal distance between the contacts as well as between the electrodes with respect to each other.

The construction made up with a single piece of contact 4 and an electrode 6 corresponding thereto may be employed to constitute a single piece of pressure-sensitive sensor 1.

Figure 3:
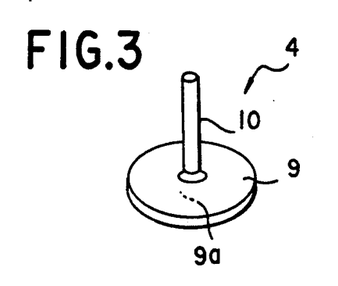
FIG. 3 is a single body perspective view illustrating the 1st example of a contact.
Figure 4:
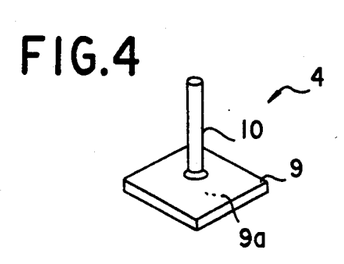
FIG. 4 is a single body perspective view illustrating the 2nd example of the contact.
Figure 5:
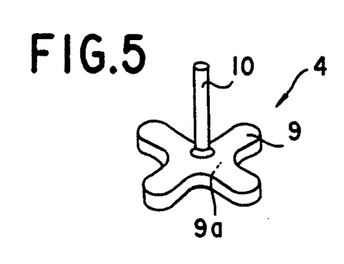
FIG. 5 is a single body perspective view illustrating the 3rd example of the contact.

As shown in FIG. 3, the above-mentioned contact 4 is comprised of a disc-shaped face-defined body 9 defining a pressure face at the lower end thereof, and a rod- or a needle-shaped contacting convex portion 10 vertically protruding on top of the face-defined body 9. The above-mentioned face-defined body 9 is not limited to the shape of a square as illustrated in FIG. 4 or a triangle or any other polygon or even a petal shape as illustrated in FIG. 5. Furthermore, it needs not taking the shape of a plate with an even thickness, however, it should define a pressure face at the lower end thereof.

Each contacting convex portion 10 of the contact 4 is illustrated as having a flat end surface, however, it may be formed in a spherical or any other convex shape.

Figure 6:
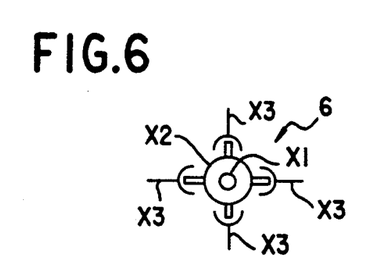
FIG. 6 is a plan view illustrating the 1st example of an electrode.
Figure 7:
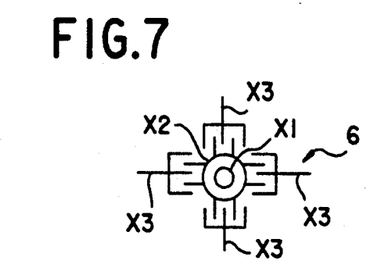
FIG. 7 is a plan view illustrating the 2nd example of the electrode.
Figure 8:
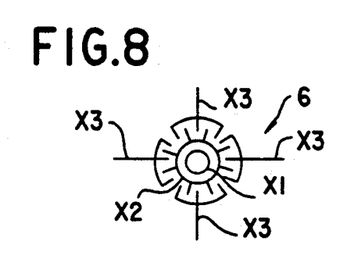
FIG. 8 is a plan view illustrating the 3rd example of the electrode.

An electrode may be built up with a parallel electrode or an electrode in the shape of comb teeth. It is more preferable to arrange a plurality of electrodes under the periphery of the pressure face 9a of the contact 4 so that the direction in which a pressure acts on the contact 4 is sensed. FIG. 6 shows an example of construction of electrodes, wherein the construction comprises a center electrode X1, a common electrode X2 surrounding the center electrode, and external electrodes X3 . . . X3 arranged around the common electrode X2 maintaining an angular interval of 90 degree between them. The above-mentioned center electrode X1 is disposed under the center of the pressure face 9a of the contact 4. In this construction, the downwardly acting pressure from the center of the pressure 9a is taken from between the center electrode X1 and the common electrode X2, and each of the downwardly acting pressures from the periphery of the pressure face 9a is taken from between the common electrode X2 and the external electrode X3 . . . X3. There is no restriction also on the shape of electrodes. For example, even in the case that electrodes are arranged in the shape as illustrated in FIG. 7 or 8, the similar effect of action is obtainable. External electrodes may be arranged in 8 or other numbers as illustrated in FIG. 9, or a center electrode X1 may be excluded.

By the above-mentioned construction, the contacting convex portion 10 of the contact 4 being in the condition as illustrated in FIG. 1 is given pressure, the action of the pressure force provided by the pressure face 9a of the contact 4 then causes the pressure-sensitive and conductive elastomer sheet 2 to be compressed and deformed, and the value of the electrical resistance thereof is reduced. Then, changes in the value of the electrical resistance are taken from the electrode 6 and fed to a operation circuit 8. Then, the operations on the quantity of the pressure force on the basis of electrical signal thereof are made by the operation circuit 8.

Figure 9:
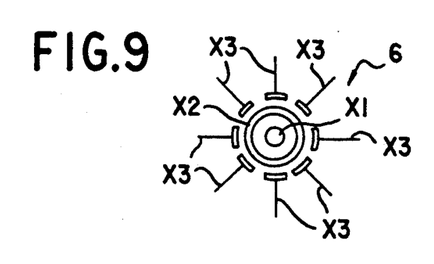
FIG. 9 is a plan view illustrating the 4th example of the electrode.

If the construction is made as illustrated in FIG. 6 or 9, by the action of the pressure being obliquely or horizontally exerted on the contacting convex portion 10 of the contact 4, the pressure face 9a is made to tilt, the pressure-sensitive and conductive elastomer sheet 2 is unevenly compressed and deformed, a plurality of different electric signals are taken from the common electrode X2 and each of the external electrodes X3 . . . X3, and the operation circuit 8 detects the direction in which the pressure is acting on the basis of a plurality of electrical signals. If the operation circuit 8 is made to perform temperature compensation, pressure detection with high accuracy is obtainable.

The insulation shell 3 by which the contact 4 is effectively and resiliently supported not only covers the surface of the pressure-sensitive and conductive elastomer sheet 2 but acts to protect the interior of the pressure-sensitive and conductive elastomer sheet 2, etc., and if the surface of the insulation shell 3 is decorated, it will contribute to the aesthetic appearance of the pressure-sensitive sensor 1.

Figure 10:
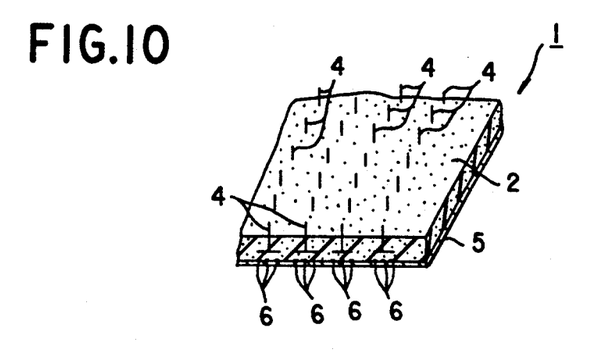
FIG. 10 is a perspective view illustrating the whole construction of the pressure-sensitive sensor related to the 2nd embodiment of the present invention.

FIG. 10 shows the 2nd embodiment, in which contacts 4 are resiliently supported in a manner that the lower ends thereof are embedded in a pressure-sensitive and conductive elastomer sheet 2, and which is identical to the 1st embodiment in terms of the construction of other portions.

Figure 11:
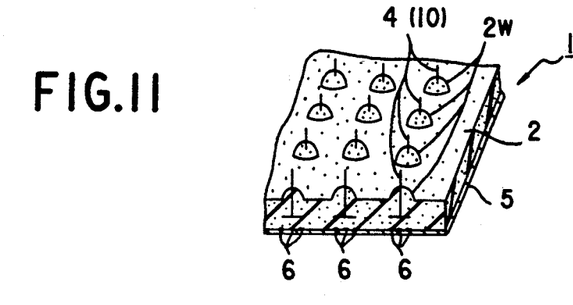
FIG. 11 is a perspective view illustrating the whole construction of the pressure-sensitive sensor related to the 3rd embodiment of the present invention.

FIG. 11 shows the 3rd embodiment, in which convex portions 2w are formed on the surface of a pressure-sensitive and conductive elastomer sheet 2, contacting convex portion 10 of a contact being made to protrude from the upper ends of the convex portions 2w, and which is identical to the 2nd embodiment in terms of the construction of other portions.

Figure 12:
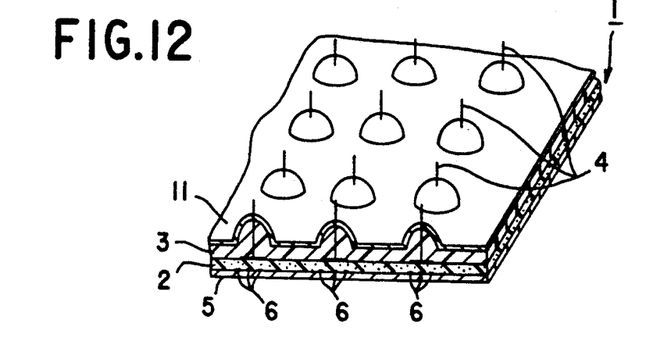
FIG. 12 is a perspective view illustrating the whole construction of the pressure-sensitive sensor related to the 4th embodiment of the present invention

FIG. 12 shows the 4th embodiment, in which the upper surface of an insulation shell 3 is covered by a protective covering elastomer 11, and which is identical to the 1st embodiment in terms of the construction of other portions.

Figure 13:
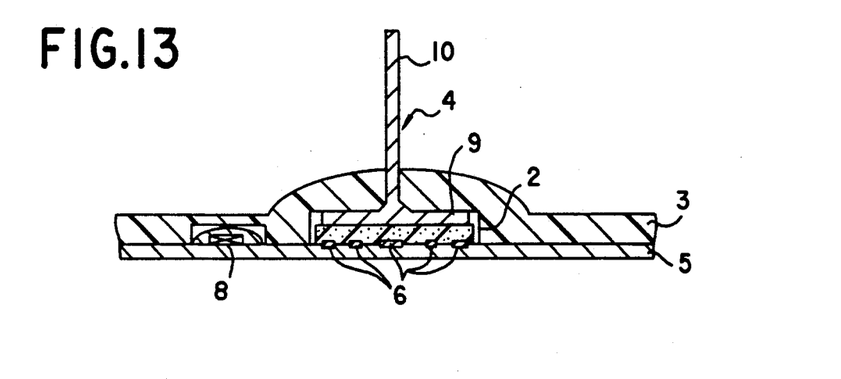
FIG. 13 is an enlarged vertical sectional front view illustrating the major portion of the pressure-sensitive sensor related to the 5th embodiment of the present invention.

FIG. 13 shows the 5th embodiment, in which the provision is made at the rate of one pressure-sensitive and conductive elastomer sheet 2 being formed as a small-sized piece to one contact 4, and which is identical to the 1st embodiment in terms of the shape of the contact 4, the construction of electrodes 6, etc. Furthermore in the 5th embodiment, if the contact 4 and electrodes 6 are provided at a plurality of positions, the deformation of a pressure-sensitive and conductive elastomer sheet 2 independently occurs with respect to each contact 4, and thereby the situation is certainly avoidable that the electrodes adjacent to each other give negative effects upon each other.

Figure 14:
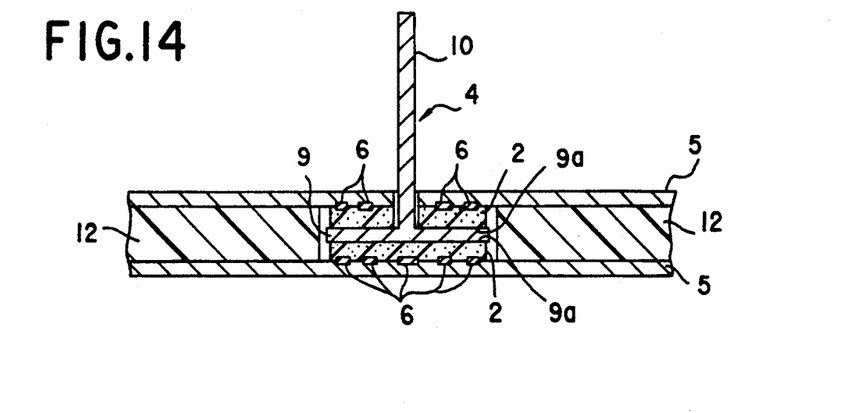
FIG. 14 is an enlarged vertical sectional front view illustrating the major portion of the pressure-sensitive sensor related to the 6th embodiment of the present invention.

FIG. 14 shows the 6th embodiment, in which the upper and lower surfaces of a face-defined body 9 of a contact 4 are made to constitute pressure faces 9a, 9a, on either upper and lower sides of the face-defined body 9 are disposed small pieces of pressure-sensitive and conductive elastomer sheets 2, 2, and changes in the electrical resistance occurring in response to the deformation of both the pressure-sensitive and conductive elastomer sheets 2, 2 are taken by respective electrodes 6, 6 of printing circuit substrates 5, 5 disposed on the upper and lower sides of a spacer 12 having elasticity. And, in terms of the shape of the contact 4 and the construction of the electrodes 6, the 6th embodiment is identical to the 1st embodiment. Furthermore in the 6th embodiment, two pressure-sensitive and conductive elastomer sheets 2, 2 are deformed in response to the displacement of a single piece of contact 4, and therefore the high and improved sensitivity is obtainable, and even in the case that the upwardly exerted pressure (for example, tensil strength) acts on the contact 4, it is detectable.

Figure 15:
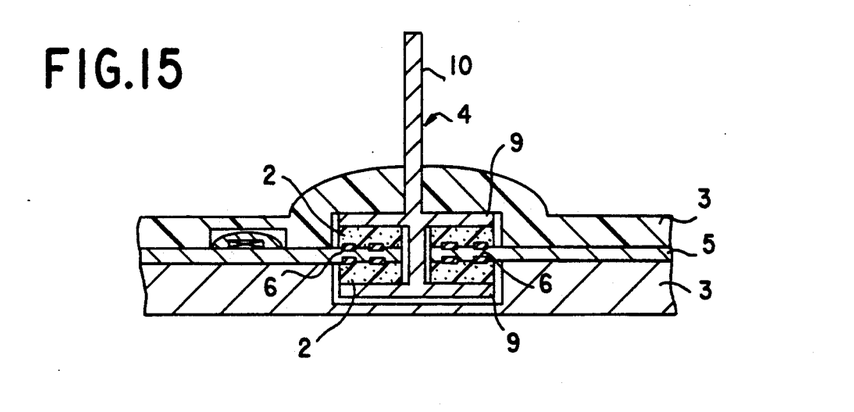
FIG. 15 is an enlarged vertical sectional front view illustrating the major portion of the pressure-sensitive sensor related to the 7th embodiment of the present invention.

FIG. 15 shows the 7th embodiment, in which face-defined bodies 9, 9 of a contact 4 are separated and attached respectively to the upper and lower stages, between both the face-defined bodies 9, 9 is disposed a print substrate 5 having electrodes 6, 6 on both the upper and lower surfaces thereof. Between each of the face-defined bodies 9, 9 and each of the electrodes 6, 6 are interposed small pieces of pressure-sensitive and conductive elastomer sheets 2, and both the upper and lower surfaces as well as both the sides thereof are entirely covered by insulation shells 3 (the insulation shell 3 at the lower side has high rigidity). In terms of the shape of a contact 4 (face-defined body 9) and the construction of the electrodes 6, the 7th embodiment is identical to the 1st embodiment. Also in the 7th embodiment, the sensitivity is improved, and the upwardly exerted pressure acting on the contact 4 is detectable, similarly to the case of the 6th embodiment.

Figure 16:
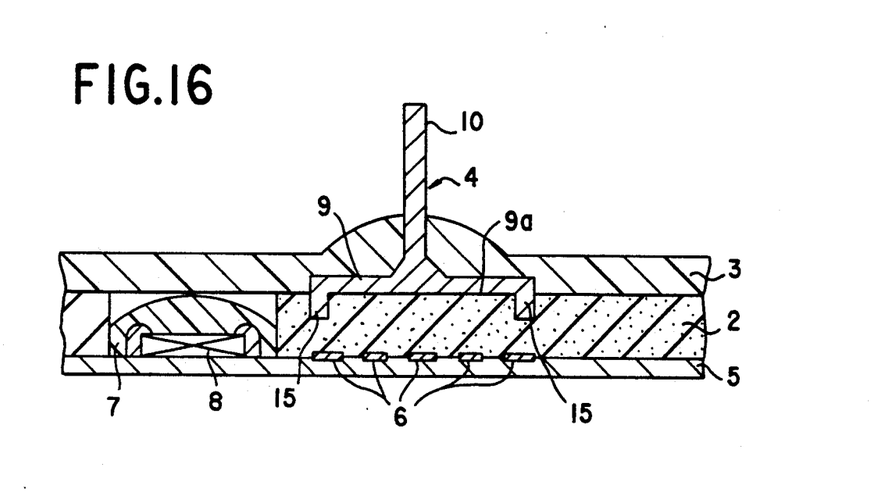
FIG. 16 is an enlarged vertical sectional front view illustrating the major portion of the pressure-sensitive sensor related to the 8th embodiment of the present invention.
Figure 17:
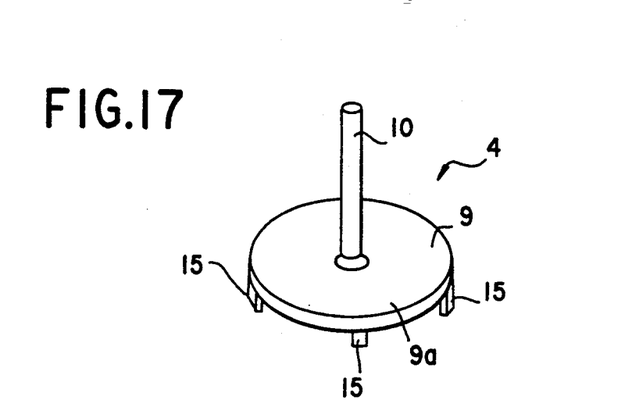
FIG. 17 is a single body perspective view illustrating the contact for use in the pressure-sensitive sensor in the above-mentioned 8th embodiment.

FIG. 16 shows the 8th embodiment, in which on the periphery of a pressure face 9a of a face-defined body 9 of a contact 4 are formed overload preventing convex portions 15 . . . 15 embedded in the pressure-sensitive and conductive elastomer sheet 2 as illustrated in FIG. 17, which is identical to the 1st embodiment in terms of the construction of other portions. Furthermore, in the 8th embodiment, arrangements are made for improving the durability of individual portions. For example, in the case that a pressure exceeding the maximum allowable value acts on the contact 4, the deformation of the pressure-sensitive and conductive elastomer sheet 2 is prevented from exceeding the predetermined fact- or by the action of convex portions 15 . . . 15. Such a construction as comprising the overload preventing convex portions 15 . . . 15 may be adapted also to the 2nd or 7th embodiment in the foregoing description.

Figure 18:
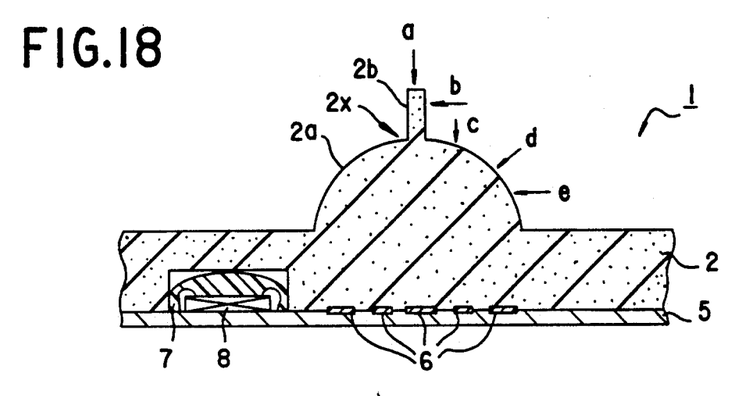
FIG. 18 is an enlarged vertical sectional front view illustrating the major portion of the pressure-sensitive sensor related to the 9th embodiment of the present invention.

FIG. 18 shows the 9th embodiment, in which, on the surface of a pressure-sensitive and conductive elastomer sheet 2 is formed a pressure detecting convex portion 2x as a composite mould body, which is made up with a hemisphere-shaped base 2a and a rod- or needle-shaped extreme point 2b made to protrude from the base 2a toward the surface side. However, it not always needs being in the hemisphere-shape. It can be modified, if necessary, by removing the extreme point 2b and leaving the base 2a only, or by forming it in the polygonal shape of the type of a square and the like, the cylindrical or rectangular parallel-piped shape.

Figure 19:
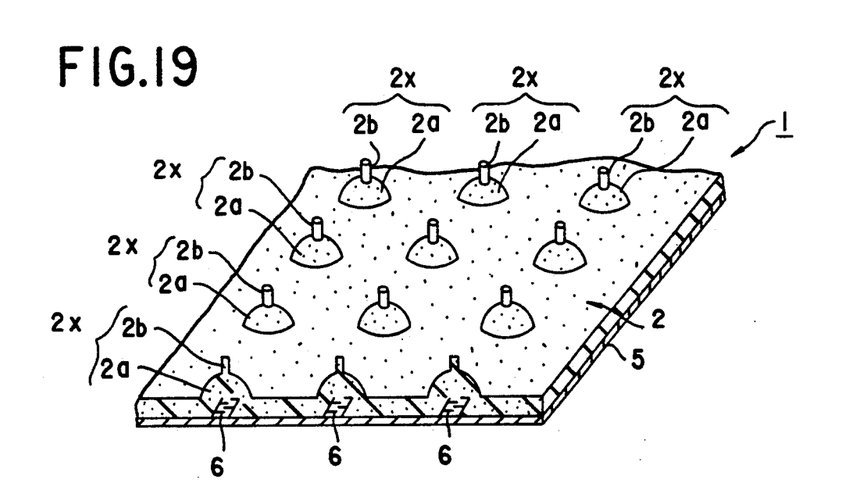
FIG. 19 is a perspective view showing the whole construction of the above-mentioned 9th embodiment.

FIG. 19 shows an arrangement, wherein on the surface of the afore-mentioned pressure-sensitive and conductive elastomer sheet 2 is, as a composite unit, formed a plurality of pressure detecting convex portions 2x . . . 2x with the predetermined regularity and further at regular intervals therebetween in the lengthwise and horizontal directions in accordance with this embodiment, and on the reverse side of an individual pressure detecting convex portion 2x is disposed an individual electrode 6. In that case, a pair of parallel electrodes or the electrodes in the shape of comb teeth may be employed. However, preferably, a plurality of electrodes are arranged under the periphery of pressure detecting convex portions 2x in the similar fashion as that used in the foregoing description on the 1st embodiment so that a direction in which a pressure is acting on the pressure detecting convex portions 2x may be detectable. It is also possible to define a single and one pressure sensing sensor 1 made up with a single and one pressure detecting portion 2x and an electrode 6 corresponding thereto.

In accordance with the construction employed in the 9th embodiment, therefore, even if a pressure is given in one of a variety of directions with arrow marks of a, b, c, d and e, it causes the pressure-sensitive and conductive elastomer sheet 2 to be deformed, changes in the electrical resistance are taken from the electrodes 6, and a direction in which the pressure is detectable.

Figure 20:
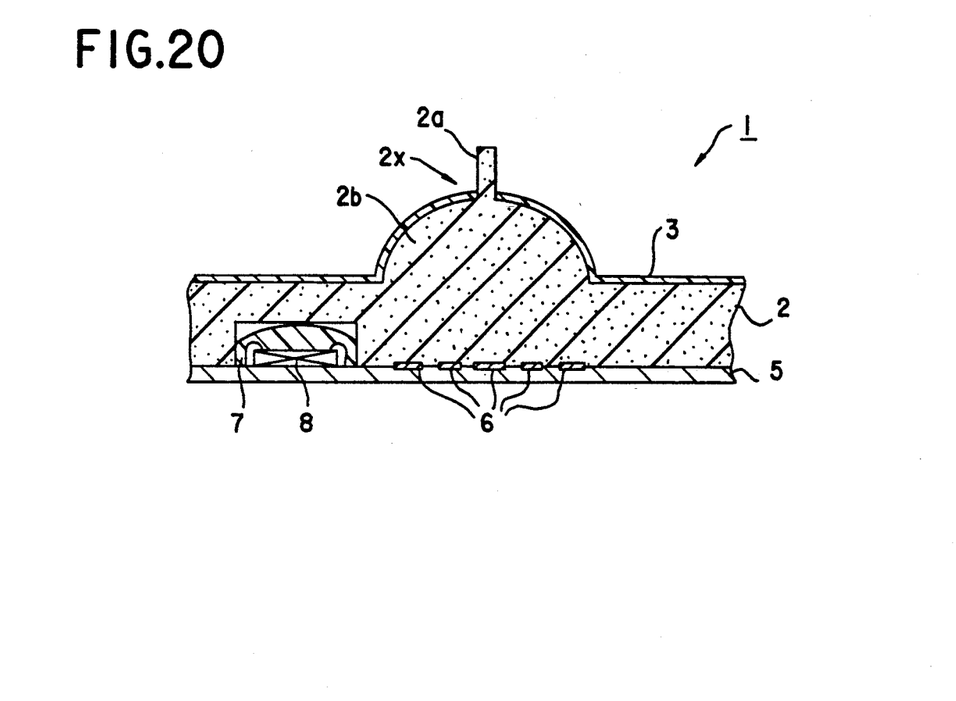
FIG. 20 is an enlarged vertical sectional front view illustrating the major portion of the pressure-sensitive sensor related to the 10th embodiment of the present invention.

FIG. 20 shows the 10th embodiment, in which the surface of a pressure-sensitive elastomer sheet 2 is covered by an insulation shell 3 made of rubber and the like having good resilient properties, and which is identical to the 9th embodiment in terms of the construction of other portions.

It will be understand from the foregoing description that, according to the pressure-sensitive sensor of the present invention, the pressure force is not scattered but concentrated on a pressure detecting convex portion formed as a composite mold unit or a contact separately disposed on the surface side of a pressure-sensitive and conductive elastomer component. Consequently, the improved resolving power is obtainable, and either a pressure exerted in the direction parallel with the surface of the pressure-sensitive and conductive elastomer component and a pressure exerted in the oblique direction with a slight angle are detectable. The number of detectable pressure directions is also multiplied, resulting in discrimination of the pressure direction, and thus the function as a tactile means is available.

What is claimed is:

1. A pressure-sensitive sensor comprising:
    a pressure-sensitive and conductive elastomer component;
    an electronic sensing means disposed at a first location on a front side of said pressure-sensitive and conductive elastomer component for sensing changes in the electrical resistance occurring in response to the deformation thereof; and
    a pressure sensing convex portion formed at a second location opposite the first location on a reverse side of said pressure-sensitive and conductive elastomer component, wherein
    said electronic sensing means comprises a plurality of electrodes arranged such that the direction of pressure exerted upon said convex portion in a plurality of directions relative to said surface of said pressure-sensitive and conductive component may be detected.

2. A pressure-sensitive sensor as recited in claim 1, wherein on the reverse side of said pressure-sensitive and conductive component a plurality of said pressure sensing convex portions are regularly arranged, and on the front side opposite each first location where each said pressure detecting convex portion is formed is disposed said plurality of electrodes.

3. A pressure-sensitive sensor comprising:
    a contact including a face-defined body defining a pressure face and further a contacting convex portion made to protrude from said face-defined body;
    a pressure-sensitive and conductive elastomer component under pressure from the pressure face of said contact;
    an electronic sensing means connected to said contact through said pressure-sensitive and conductive elastomer component for sensing changes in the electrical resistance occurring in response to the deformation of said pressure-sensitive and conductive elastomer component, wherein said contact is shiftably supported against said pressure-sensitive and conductive elastomer component, and wherein the contacting convex portion of said contact is made to protrude outwardly of the surface of said pressure-sensitive and conductive elastomer component so that the direction of pressure exerted upon said contact in a plurality of directions relative to said surface of said pressure-sensitive and conductive component may be detected by said electronic sensing means.

4. A pressure-sensitive sensor as recited in claim 3, wherein the surface of said pressure-sensitive and conductive elastomer component is covered by an insulation shell, a face-defined body of said contact is positioned inwardly of said insulation shell, and said contacting convex portion of said contact is made to protrude outwardly of the surface of said insulation shell.

5. A pressure sensitive sensor as recited in claim 3, wherein said contact is made of plastic, ceramic, rubber or metallic materials, and on the pressure surface of said contact is formed an overload preventing convex portion.

6. A pressure-sensitive sensor as recited in claim 3, wherein said insulation shell is made of synthetic rubber or thermoplastic.

7. A pressure-sensitive sensor as recited in claim 3, wherein said electronic sensing means comprises a plurality of electrodes disposed at a plurality of locations around a position corresponding to the center of the pressure face of said contact.

8. A pressure-sensitive sensor as recited in claim 1 or 7, wherein an operation circuit is incorporated for controlling electrical signals supplied from said electrodes.

* * * * *

UNITED STATES PATENT AND TRADEMARK OFFICE
CERTIFICATE OF CORRECTION

PATENT NO. : 5,311,779
DATED : May 17, 1994
INVENTOR(S) : Teruo Okamoto

It is certified that error appears in the above-indentified patent and that said Letters Patent is hereby corrected as shown below:

On the title page, item [75] Inventor: "Okamoto Teruo" should read-- Teruo Okamoto--.

Signed and Sealed this

Eleventh Day of October, 1994

Attest:

BRUCE LEHMAN

Attesting Officer

Commissioner of Patents and Trademarks